(12) United States Patent
Fredenburg

(10) Patent No.: US 10,788,153 B2
(45) Date of Patent: Sep. 29, 2020

(54) JOINT ASSEMBLY FOR FLUID CARRYING PIPES

(71) Applicant: Lindsay Corporation, Omaha, NE (US)

(72) Inventor: Michael Fredenburg, Hickman, NE (US)

(73) Assignee: Lindsay Corporation, Omaha, NE (US)

( * ) Notice: Subject to any disclaimer, the term of this patent is extended or adjusted under 35 U.S.C. 154(b) by 386 days.

(21) Appl. No.: 15/833,570

(22) Filed: Dec. 6, 2017

(65) Prior Publication Data

US 2019/0170286 A1    Jun. 6, 2019

(51) Int. Cl.
*F16L 23/032*    (2006.01)
*F16L 57/00*    (2006.01)
*F16L 23/02*    (2006.01)
*F16L 58/18*    (2006.01)

(52) U.S. Cl.
CPC ............. *F16L 23/032* (2013.01); *F16L 23/02* (2013.01); *F16L 57/005* (2013.01); *F16L 58/187* (2013.01)

(58) Field of Classification Search
CPC ....... F16L 23/032; F16L 23/02; F16L 23/125; F16L 57/005; F16L 58/187
USPC .......... 285/55, 363, 364, 368, 405, 406, 412
See application file for complete search history.

(56) References Cited

U.S. PATENT DOCUMENTS

| | | | |
|---|---|---|---|
| 4,101,112 A * | 7/1978 | Conners | |
| 4,281,859 A * | 8/1981 | Davies | F16L 23/125 285/55 |
| 4,336,958 A * | 6/1982 | Goetzinger | F16L 58/187 285/55 |
| 4,432,572 A * | 2/1984 | Thalmann | F16L 23/02 285/368 |
| 5,876,070 A * | 3/1999 | McNealy | F16L 58/187 285/363 |
| 7,527,306 B2 * | 5/2009 | Ben-Horin | 285/412 |

* cited by examiner

*Primary Examiner* — Zachary T Dragicevich
(74) *Attorney, Agent, or Firm* — Hovey Williams LLP

(57) ABSTRACT

A joint assembly for joining two pipes together comprises first and second liners and first and second pipe flanges. Each liner includes a sleeve and a liner flange with the liner flange coupled to one end of the sleeve. The first liner may be positioned within a first pipe and the second liner may be positioned within a second pipe. Each pipe flange includes an inner surface and an opposing outer surface with a plurality of circumferentially spaced plateaus positioned thereon. Each plateau has a height above the outer surface. The first pipe flange may be coupled to one end of the first pipe and the second pipe flange may be coupled to one end of the second pipe. The first and second pipe flanges may couple to one another such that each plateau on the first pipe flange contacts a corresponding plateau on the second pipe flange.

16 Claims, 6 Drawing Sheets

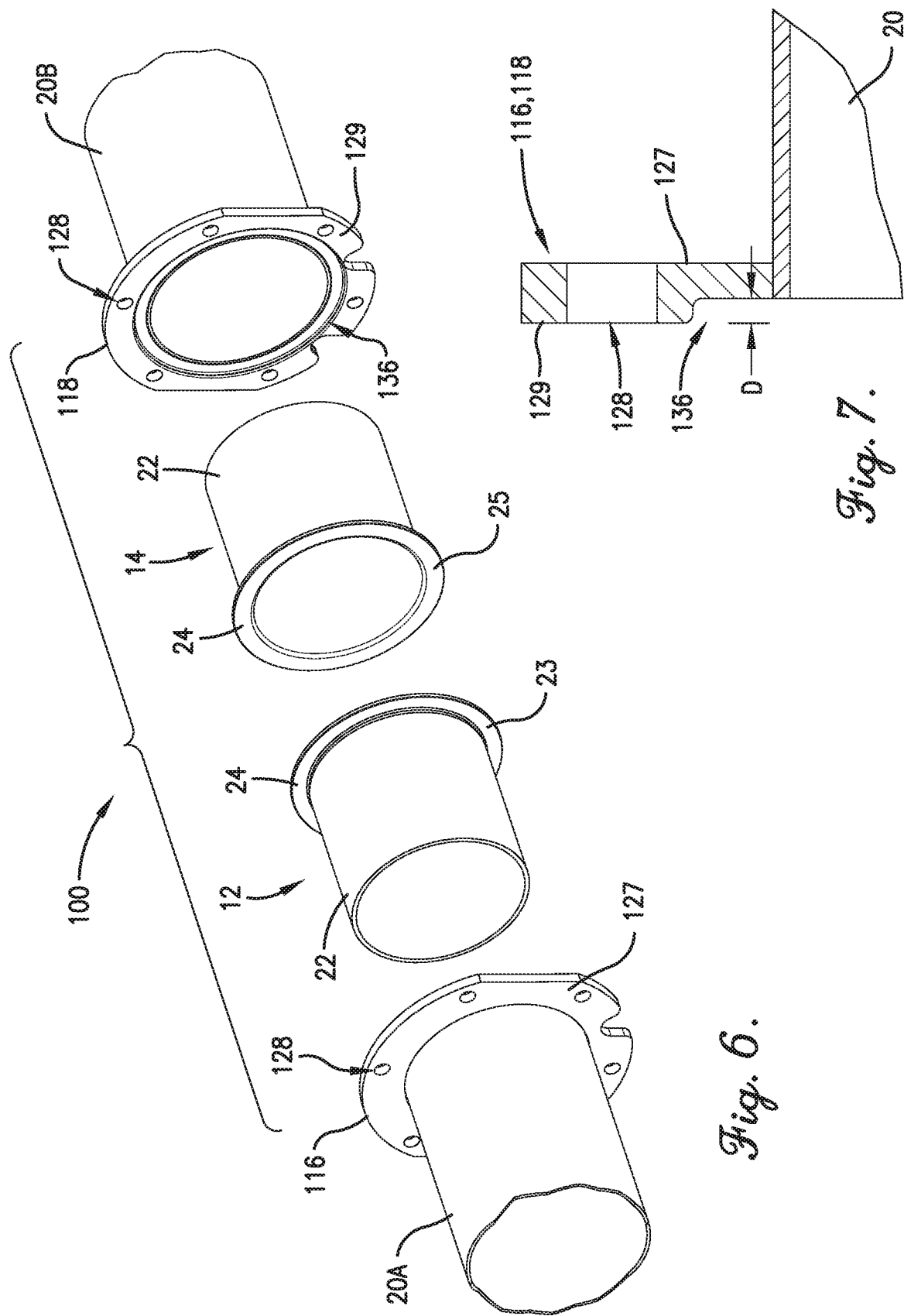

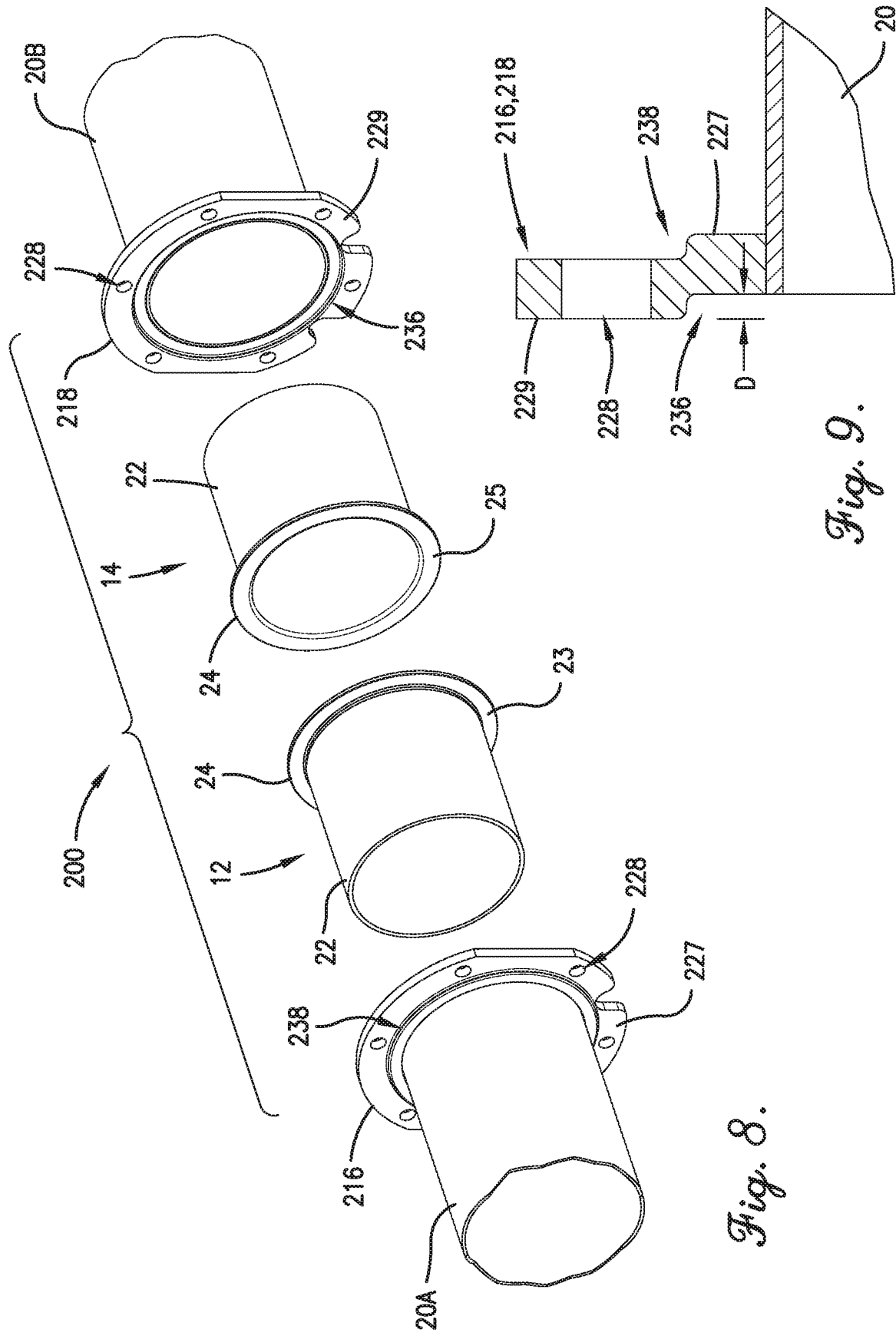

JOINT ASSEMBLY FOR FLUID CARRYING PIPES

BACKGROUND OF THE INVENTION

Field of the Invention

Embodiments of the current invention relate to joints for irrigation system pipes and other pipes that carry fluids.

Description of the Related Art

Fluid carrying pipes may be implemented in crop irrigation systems, gas or oil pipelines, refineries and processing plants, plumbing systems, drainage systems, and the like. Typically, the pipes are joined to one another to form systems that carry the fluid over great distances. To create a joint between two pipes, each pipe may include a pipe flange extending radially outward from the circumference of each end of the pipe. Each pipe may further include a pair of liners, each liner including a sleeve and a liner flange with the liner flange coupled to one end of the sleeve. One liner fits within each end of the pipe such that an inner surface of the liner flange contacts at least a portion of the outer surface of the pipe flange. The pipes may be joined together such that the outer surface of one pipe flange may contact the outer surface of an adjacent pipe flange. Typically the one pipe flange is coupled to the adjacent pipe flange using circumferentially-spaced fasteners such as screws which extend through both flanges to hold them together and form a seal between the two liner flanges.

Many prior art pipe flanges include a raised face on the outer surface wherein an annular portion of the flange, adjacent to the inner circumference, has a height above the rest of the outer surface. The height differential creates a gap adjacent to the outer circumference between the two pipe flanges when they are joined together. The fasteners holding the two pipe flanges together are usually positioned closer to the outer circumference, or radially outward from the raised face—which means the fasteners extend from one flange to the other through the gap. Coupling one pipe flange to the other across the gap may lead to non-uniform pressure around the circumference being applied to the seal, which may cause problems during operation of the system in which the pipes are utilized.

SUMMARY OF THE INVENTION

Embodiments of the current invention solve the above-mentioned problems and other problems and provide a distinct advance in the art of assemblies for joining two pipes together. Specifically, the current invention provides a joint assembly that includes first and second pipe flanges, each with a plurality of raised plateaus on an outer surface. The first and second pipe flanges couple to one another such that the plateaus on the first pipe flange contact the plateaus on the second pipe flange. This structure provides uniform pressure on a seal formed between the pipes that are joined together. In addition, varying the height of the plateaus varies the pressure on the seal.

In one embodiment, the joint assembly comprises first and second liners and first and second pipe flanges. Each liner includes a sleeve and a liner flange with the liner flange coupled to one end of the sleeve. The first liner is configured to be positioned within a first pipe and the second liner is configured to be positioned within a second pipe. Each pipe flange is of generally annular disc shape with an inner surface and an opposing outer surface including a plurality of circumferentially spaced plateaus positioned thereon. Each plateau has a height above the outer surface. The first pipe flange is configured to be coupled to one end of the first pipe and the second pipe flange is configured to be coupled to one end of the second pipe. The first and second pipe flanges are configured to couple to one another such that each plateau on the first pipe flange contacts a corresponding plateau on the second pipe flange.

In another embodiment, the current invention provides a two pipe assembly comprising first and second pipes, first and second liners, and first and second pipe flanges. The first and second pipes are axially aligned with one another. Each liner includes a sleeve and a liner flange with the liner flange coupled to one end of the sleeve. Each liner flange includes an inner surface adjacent to the sleeve and an outer surface facing away from the sleeve. The first liner is positioned within the first pipe, and the second liner positioned within the second pipe. The first and second liners face each other such that the outer surface of the first liner contacts the outer surface of the second liner to form a seal between the first pipe and the second pipe.

Each pipe flange is of generally annular disc shape with an inner surface and an opposing outer surface including a plurality of circumferentially spaced plateaus positioned thereon. Each plateau has a height above the outer surface. The first pipe flange is coupled to one end of the first pipe, and the second pipe flange is coupled to one end of the second pipe. The first and second pipe flanges are coupled to one another such that each plateau on the first pipe flange contacts a corresponding plateau on the second pipe flange.

Still another embodiment of the current invention provides a pipe comprising a hollow tubular section and first and second pipe flanges. Each pipe flange is of generally annular disc shape with an inner surface and an opposing outer surface including a plurality of circumferentially spaced plateaus positioned thereon. Each plateau has a height above the outer surface. The first pipe flange is coupled to one end of the tubular section, and the second pipe flange is coupled to the other end of the tubular section such that the outer surface of each pipe flange faces away from the tubular section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 6 is an exploded view of a joint assembly including other embodiments of the first and second pipe flanges;

FIG. 7 is an enlarged portion of a cross sectional view of one of the pipe flanges of FIG. 6, the pipe flange including a recess with a depth D;

FIG. 8 is an exploded view of a joint assembly including still other embodiments of the first and second pipe flanges; and FIG. 9 is an enlarged portion of a cross sectional view of one of the pipe flanges of FIG. 8, the pipe flange including an recess with a depth D and an inner recess.

Figure 1:
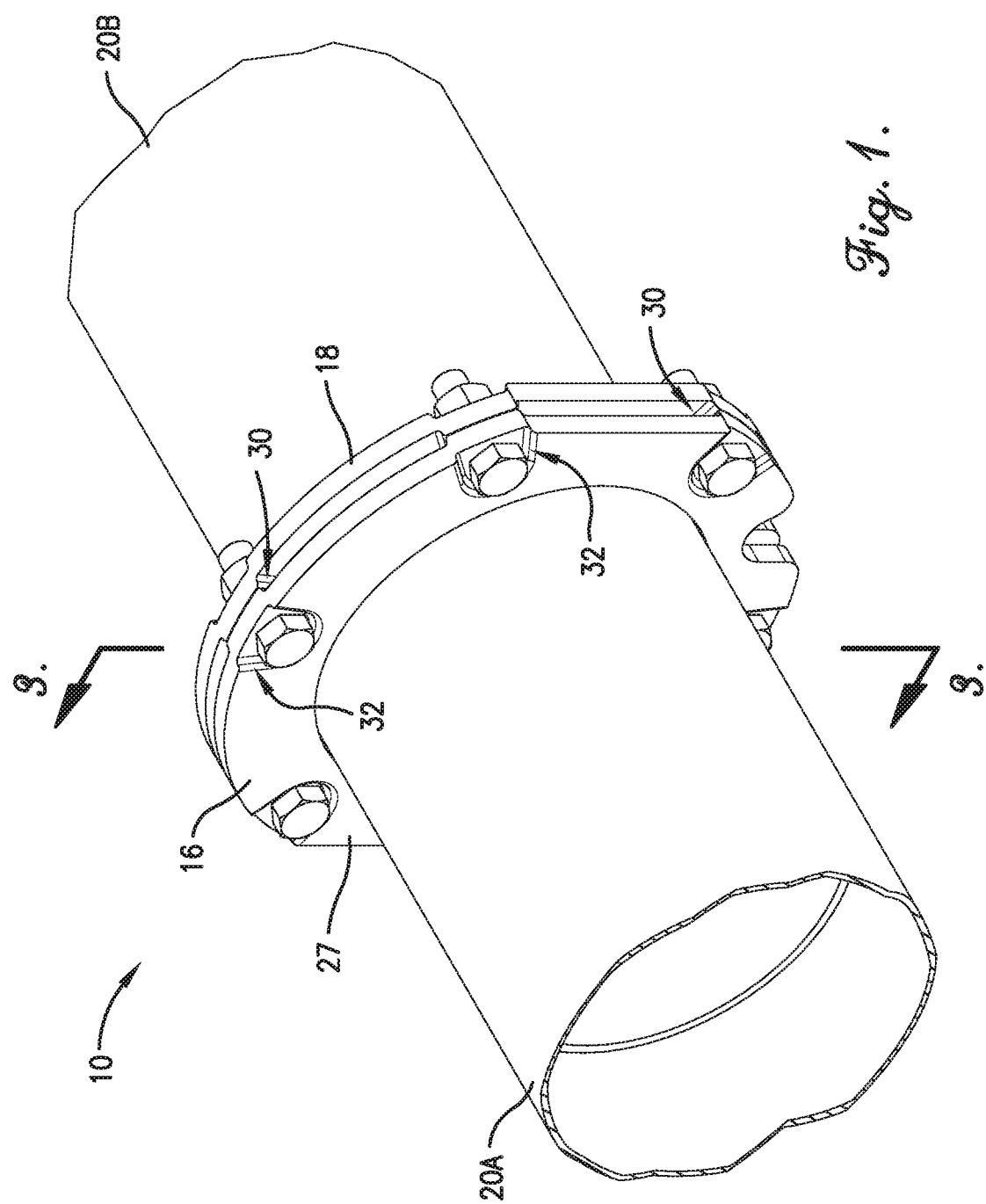
FIG. 1 is a perspective view of a joint assembly, constructed in accordance with various embodiments of the current invention, for joining two pipes together, the joint assembly including at least first and second pipe flanges.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
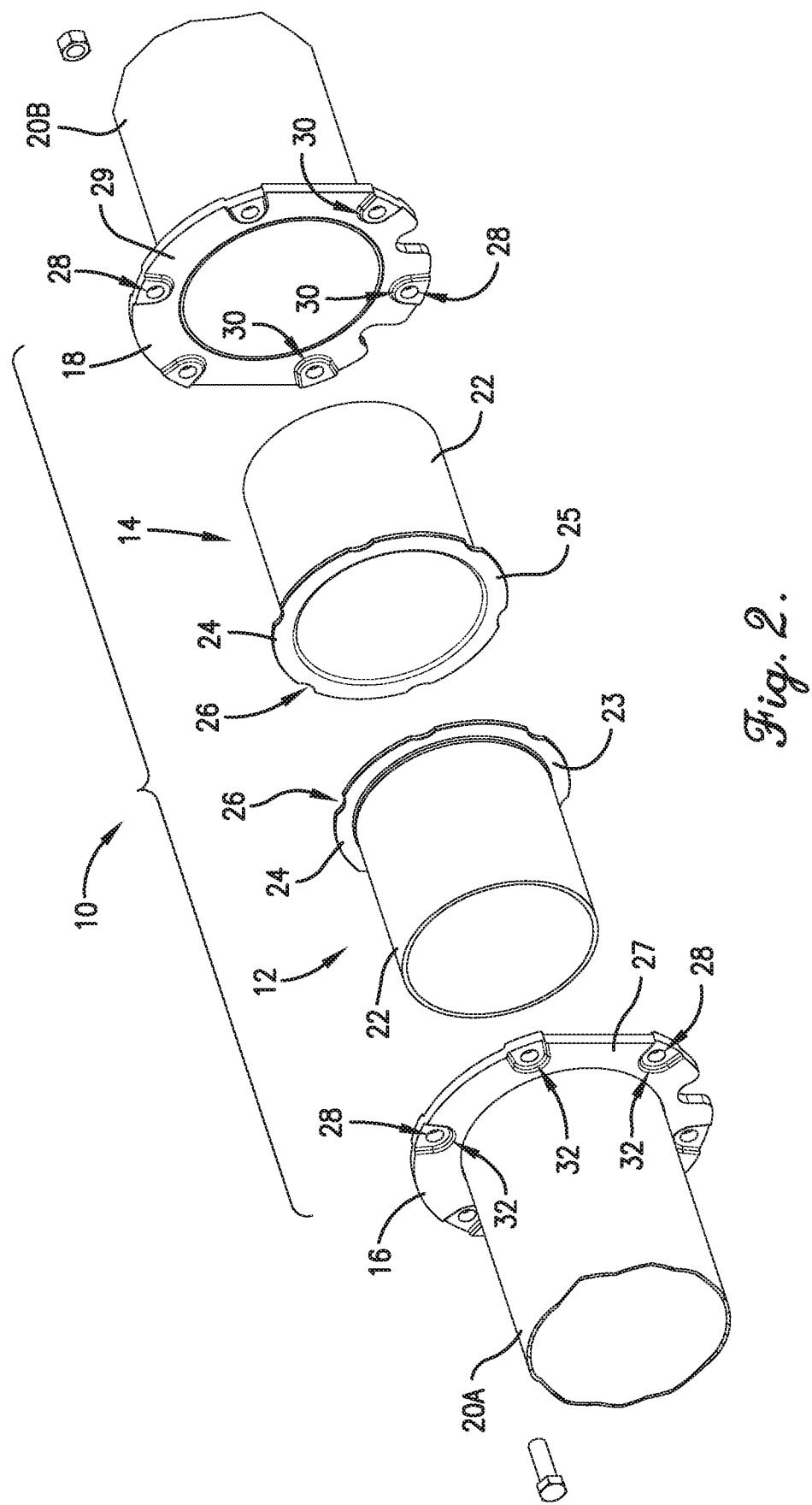
FIG. 2 is an exploded view of the joint assembly with the first and second pipe flanges and further including first and second liners.
Figure 3:
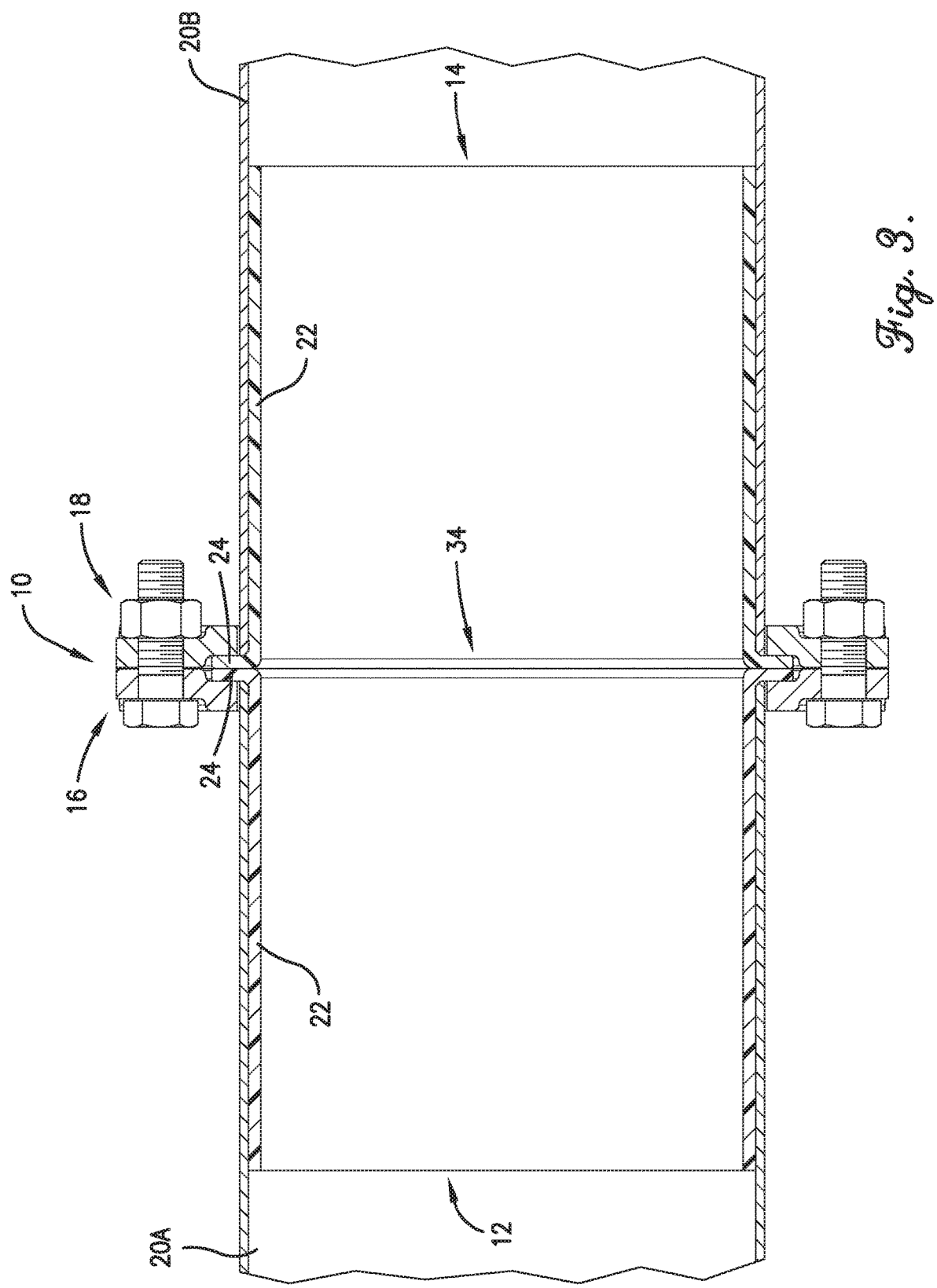
FIG. 3 is a cross sectional view of the joint assembly cut along the line 3-3 of FIG. 1, illustrating the two pipes, the first and second flanges, and the first and second liners forming a seal between the pipes.

A joint assembly 10, constructed in accordance with various embodiments of the current invention, for fluid carrying pipes is shown in FIGS. 1-3. The joint assembly 10 may broadly comprise a first liner 12, a second liner 14, a first pipe flange 16, and a second pipe flange 18. The joint assembly 10 may be implemented with pipes 20 (20A, 20B) that are joined together to carry a large volume of fluid. Each pipe 20 is generally of hollow cylindrical or tubular shape with opposing open ends and may be formed from metals or plastics. Embodiments of the current invention are particularly suited for use with mobile irrigation systems, but may be used with any fluid-carrying pipes.

The first liner 12 may include a sleeve 22 and a liner flange 24, as best seen in FIG. 2. The sleeve 22 may be of hollow cylindrical or tubular shape. The liner flange 24 is attached to one end of the sleeve 22 and is of generally annular disc shape with an inner surface 23 and an opposing outer surface 25. The liner flange 24 includes an inner edge to which the sleeve 22 is attached and a radially-spaced outer edge with a plurality of circumferentially-distributed cutouts 26 formed thereon. One embodiment of the liner flange 24 includes six cutouts 26 along the outer edge spaced apart by a rotational angle of approximately 60 degrees. Each cutout 26 may have a semicircular, semioval, semielliptical, or generally arcuate concave shape. The inner edge of the liner flange 24 is coupled to one end of the sleeve 22 along an outer circumference thereof. Furthermore, the outer surface 25 of the liner flange 24 faces away from the sleeve 22, while the inner surface 23 is positioned adjacent to the sleeve 22. In some embodiments, the first liner 12 may be of monolithic construction with the sleeve 22 and liner flange 24 forming a single piece. In other embodiments, the sleeve 22 and the liner flange 24 may be separate pieces that are rigidly connected to one another.

The first liner 12 is positioned within a pipe 20 and has a length that is just a fraction of the length of the pipe 20, as best illustrated in FIG. 3. The sleeve 22 of the first liner 12 has an outer diameter that is slightly less than an inner diameter of the pipe 20. The first liner 12 may be formed from metals or plastics.

The second liner 14 is substantially identical to the first liner 12 and therefore will not be described in detail.

The first pipe flange 16 is of generally annular disc shape with an inner surface 27 and an opposing outer surface 29 with plurality of fastener openings 28 formed through the two surfaces 27, 29 at predetermined rotational angular locations. An embodiment of the first pipe flange 16 includes six fastener openings 28 positioned at rotational angle intervals of approximately 60 degrees. The first pipe flange 16 further includes an inner edge and a radially-spaced outer edge along which there may be features such as flat edges, cut outs, or the like to provide alignment during the joining process or to provide other functions.

Figure 5:
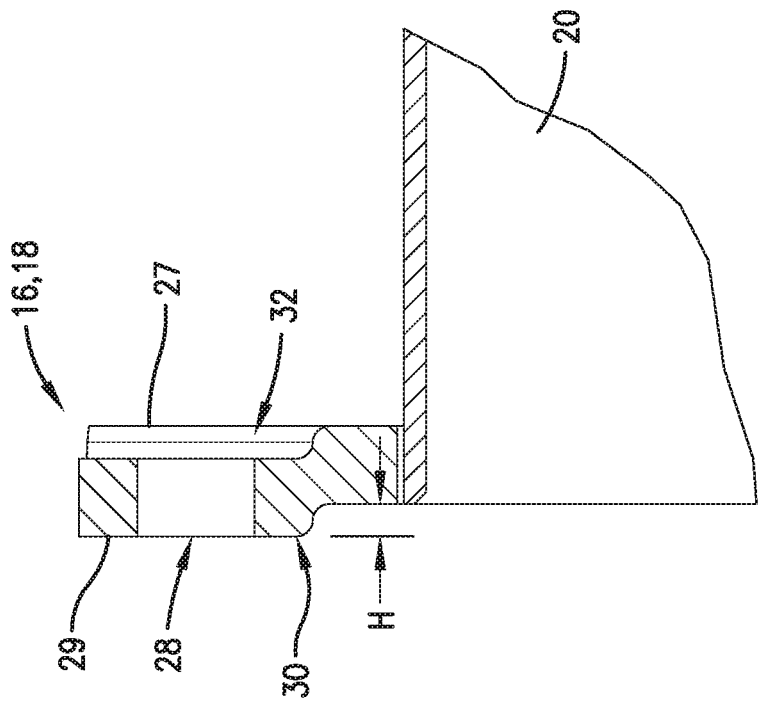
FIG. 5 is an enlarged portion of a cross sectional view of a pipe flange including an inset and a plateau, illustrating that the plateau has a height H above an outer surface of the pipe flange.

The first pipe flange 16 further includes a plurality of raised plateaus 30 and a plurality of insets 32, as seen in FIGS. 2 and 5. Each plateau 30 is positioned on the outer surface 29 of the first pipe flange 16 and includes raised material with a generally planar top surface that has a height above the outer surface 29. The perimeter of each plateau 30 may have a U shape, although square, rectangular, or other shapes are possible. Each inset 32 is positioned on the inner surface 27 of the first pipe flange 16 and may include a recess that has a depth below the inner surface 27. Similar to the plateau 30, the perimeter of each inset 32 may have a U shape, although square, rectangular, or other shapes are possible. The plateaus 30 and the insets 32 are aligned with one another such that each plateau 30 is aligned on the outer surface 29 with a respective inset 32 on the inner surface 27. Typically, the plateau 30 and inset 32 combinations are positioned on the first pipe flange 16 to intersect the outer edge or circumference thereof and spaced apart from one another. In addition, each plateau 30 and inset 32 combination are aligned with a fastener opening 28, such that a fastener opening 28 extends from each plateau 30 to its aligned inset 32. An exemplary first pipe flange 16 may include six plateau 30, inset 32, and fastener opening 28 combinations positioned at rotational angle intervals of approximately 60 degrees. In other embodiments, the first pipe flange 16 may have greater or fewer plateau 30, inset 32, and fastener opening 28 combinations. The first pipe flange 16 may be formed from metals or plastics. The plateau 30 and inset 32 combinations may be formed by molding, machining, tooling, or similar processes.

The second pipe flange 18 may be substantially identical to the first pipe flange 16 and therefore will not be described in detail.

Referring primarily to FIGS. 1 and 3, the joint assembly 10 has a structure as follows. The first pipe flange 16 is coupled to one end of a first pipe 20A, while the second pipe flange 18 is coupled to one end of a second pipe 20B. In some embodiments, each pipe flange 16, 18 is rigidly connected to the end of a pipe 20 by using techniques such as welding or through the use of adhesives. In other embodiments, each pipe flange 16, 18 may include threads on its inner circumferential edge, while one end of each pipe 20 may include threads on its outer circumferential edge. Each pipe flange 16, 18 is coupled to one end of each pipe 20 by screwing one onto the other. In still other embodiments, each pipe 20 is formed to include one pipe flange 16, 18 coupled to each end thereof, such that one pipe 20 and two pipe flanges 16, 18 are a monolithic unit.

Each pipe flange 16, 18 is coupled to one end of each pipe 20 such that the outer surface 29 of each pipe flange 16, 18 faces away from the pipe 20. And the inner surface 27 of each pipe flange 16, 18 is adjacent to the pipe 20 and faces the pipe 20. In general, and to form a larger system, each pipe 20 may have a pipe flange, such as pipe flanges 16, 18, coupled to each end thereof.

The first liner 12 is positioned within one end of the first pipe 20A such that the outer surface of the sleeve 22 faces the inner surface of the pipe 20, and the inner surface 23 of the liner flange 24 faces the outer surface 29 of the first pipe flange 16. The inner surface 23 of the liner flange 24 contacts at least a portion of the outer surface 29 of the first pipe flange 16. Each cutout 26 of the liner flange 24 is aligned with a successive one of the plateaus 30 on the outer surface 29 of the first pipe flange 16, and wraps around a portion of the plateau 30. In addition, the outer edge of the first liner 12 extends radially outward beyond an inner edge of each plateau 30. The second liner 14 is positioned within one end of the second pipe 20B in a substantially identical fashion as the first liner 12 within the first pipe 20A.

The first and second pipes 20A, 20B are axially aligned and the first pipe 20A abuts the second pipe 20B such that the outer surface 25 of the liner flange 24 of the first liner 12 contacts the outer surface 25 of the liner flange 24 of the second liner 14. And each plateau 30 of the first pipe flange 16 faces a corresponding one of the plateaus 30 of the second pipe flange 18. In addition, the fastener opening 28 on each plateau 30 of the first pipe flange 16 aligns and pairs with the fastener opening 28 on the corresponding plateau 30 of the second pipe flange 18. One fastener, such as a screw and a bolt, is positioned within each fastener opening 28 pair. The bolt is tightened on the screw of each fastener such that each plateau 30 of the first pipe flange 16 contacts the corresponding one of the plateaus 30 of the second pipe flange 18—thereby forming a tight seal 34 between the outer surface 25 of the liner flange 24 of the first liner 12 and the outer surface 25 of the liner flange 24 of the second liner 14, as seen in FIG. 3.

Having each bolt tightened until each plateau 30 of the first pipe flange 16 contacts the corresponding one of the plateaus 30 of the second pipe flange 18 ensures that uniform pressure is applied across the area of the inner surface 23 of each liner flange 24. Hence, uniform pressure is applied to the seal 34 formed between the two liner flanges 24 as well.

Figure 4:
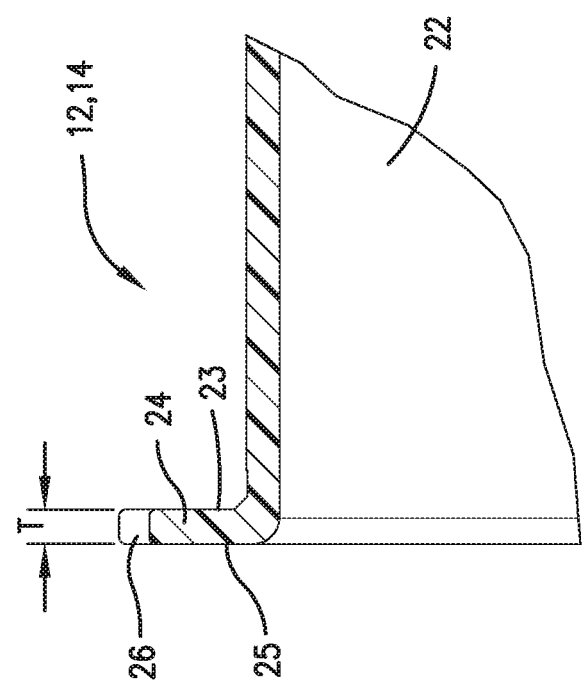
FIG. 4 is an enlarged portion of a cross sectional view of a liner including a sleeve and a liner flange illustrating that the liner flange has a thickness T.

The liner flange 24 of each liner 12, 14 has a thickness, T, between the inner surface 23 and the outer surface 25, as seen in FIG. 4. Each plateau 30 of the pipe flanges 16, 18 has a height, H, above the outer surface 29 of the pipe flange 16, 18, as seen in FIG. 5. Generally, the height H of each plateau 30 is approximately equal to the thickness T of the each liner flange 24 to ensure nominal, adequate pressure on the seal 34 formed between the two liner flanges 24. Furthermore, the height H is typically the same value for each plateau 30, and the thickness T is typically the same value for each liner flange 24. Varying the height of the plateaus 30 varies the pressure applied to the seal 34 between the two liner flanges 24. If the pressure on the seal 34 between the two liner flanges 24 needs to be increased to be greater than the nominal pressure, usually the height H is decreased to be less than the thickness T, although it is possible that the thickness T is increased to be greater than the height H. Alternatively, if the pressure on the seal 34 between the two liner flanges 24 needs to be decreased to be less than the nominal pressure, usually the height H is increased to be greater than the thickness T, although it is possible that the thickness T is decreased to be less than the height H.

Another embodiment of the current invention may provide a joint assembly 100 as shown in FIG. 6. The joint assembly 100 may be utilized with pipes 20A, 20B and includes the first and second pipe liners 12, 14, substantially identical to those described above. The joint assembly 100 further includes first and second pipe flanges 116, 118. In contrast to first and second pipe flanges 16, 18, each pipe flange 116, 118 does not include the plateaus 30 and the insets 32. Instead, each pipe flange 116, 118 includes an annular recess 136 on an outer surface 129 adjacent to an inner edge of the flange 116, 118. As seen in FIG. 7, the recess 136 has a depth D roughly equal to the thickness T of the liner flanges 24. The recess 136 may be formed by molding, machining, or the like. Each pipe flange 116, 118 also includes a plurality of fastener openings 128 extending from an inner surface 127 of the flange 116, 118 to the outer surface 129. The fastener openings 128 are positioned at rotational angle intervals, or circumferentially spaced along a circular path, in the vicinity of the outer edge.

The joint assembly 100 has a structure that is similar to the joint assembly 10. The pipe flanges 116, 118 are coupled to the pipes 20A, 20B in the same fashion as discussed above. The first and second liners 12, 14 are positioned within the pipes 20A, 20B as discussed above, such that the liner flange 24 of the first liner 12 is positioned within the recess 136 of the first pipe flange 116 and the liner flange 24 of the second liner 14 is positioned within the recess 136 of the second pipe flange 118. The outer surface 25 of the liner flange 24 of the first liner 12 contacts the outer surface 25 of the liner flange 24 of the second liner 14. And at least a portion of the outer surface 129 of the first pipe flange 116 contacts at least a portion of the outer surface 129 of the second pipe flange 118.

Yet another embodiment of the current invention may provide a joint assembly 200 as shown in FIG. 8. The joint assembly 200 may be utilized with pipes 20A, 20B and includes the first and second pipe liners 12, 14, substantially identical to those described above. The joint assembly 200 further includes first and second pipe flanges 216, 218. Like the pipe flanges 116, 118, each pipe flange 216, 218 does not include the plateaus 30 and the insets 32. Instead, each pipe flange 216, 218 includes an outer annular recess 236 on an outer surface 229 adjacent to an inner edge of the flange 216, 218 and an inner annular recess 238 on an inner surface 227 adjacent to an outer edge of the flange 216, 218. The inner recess 236 has a depth D roughly equal to the thickness T of the liner flanges 24. As seen in FIG. 9, the outer and inner recesses 236, 238 may be formed by molding, machining, pressing, punching, or other forming techniques. Each pipe flange 216, 218 also includes a plurality of fastener openings 228 extending from the inner surface 227 of the flange 216, 218 to the outer surface 229. The fastener openings 228 are positioned at rotational angle intervals, or circumferentially spaced along a circular path, in the vicinity of the outer edge.

The joint assembly 200 has a structure that is similar to the joint assembly 10. The pipe flanges 216, 218 are coupled to the pipes 20A, 20B in the same fashion as discussed above. The first and second liners 12, 14 are positioned within the pipes 20A, 20B as discussed above, such that the liner flange 24 of the first liner 12 is positioned within the outer recess 236 of the first pipe flange 216 and the liner flange 24 of the second liner 14 is positioned within the outer recess 236 of the second pipe flange 218. The outer surface 25 of the liner flange 24 of the first liner 12 contacts the outer surface 25 of the liner flange 24 of the second liner 14. And at least a portion of the outer surface 229 of the first pipe flange 216 contacts at least a portion of the outer surface 229 of the second pipe flange 218.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A joint assembly for joining two pipes together, the joint assembly comprising:
   first and second liners, each liner including a sleeve and a liner flange, the liner flange coupled to one end of the sleeve, the first liner configured to be positioned within a first pipe and the second liner configured to be positioned within a second pipe; and
   first and second pipe flanges, each pipe flange of generally annular disc shape with an inner surface and an opposing outer surface including a plurality of circumferentially spaced plateaus positioned thereon, each plateau having a height above the outer surface, the first pipe flange configured to be coupled to one end of the first pipe and the second pipe flange configured to be coupled to one end of the second pipe, the first and second pipe flanges configured to couple to one another such that each plateau on the first pipe flange contacts a corresponding plateau on the second pipe flange,
   wherein each liner includes a plurality of cutouts, each cutout having a generally arcuate concave shape and being circumferentially spaced along an outer edge of the liner flange, each cutout configured to align with a successive one of the plateaus of one pipe flange.

2. The joint assembly of claim 1, wherein an inner surface of the liner flange of the first liner is configured to contact at least a portion of the outer surface of the first pipe flange and an inner surface of the liner flange of the second liner is configured to contact at least a portion of the outer surface of the second pipe flange.

3. The joint assembly of claim 1, wherein an outer surface of the liner flange of the first liner is configured to contact an outer surface of the liner flange of the second liner to form a seal between the first pipe and the second pipe.

4. The joint assembly of claim 3, wherein the liner flange of each of the first and second liners has a variable thickness and when the thickness is approximately equal to the height of each plateau, a nominal pressure is applied on the seal between the first pipe and the second pipe.

5. The joint assembly of claim 4, wherein when the liner flange of each of the first and second liners has a thickness that is less than the height of each plateau a greater than nominal pressure is applied on the seal between the first pipe and the second pipe.

6. The joint assembly of claim 4, wherein when the liner flange of each of the first and second liners has a thickness that is greater than the height of each plateau a less than nominal pressure is applied on the seal between the first pipe and the second pipe.

7. The joint assembly of claim 1, wherein each pipe flange includes a plurality of insets positioned at rotational angles on the inner surface thereof, each inset having a depth below the inner surface and aligned with a successive one of the plateaus.

8. The joint assembly of claim 1, wherein each pipe flange includes a plurality of openings from the inner surface to the outer surface, each opening positioned within a region occupied by a successive one of the plateaus and configured to receive a successive one of a plurality of fasteners.

9. A two pipe assembly comprising:
   first and second pipes axially aligned with one another;
   first and second liners, each liner including a sleeve and a liner flange, the liner flange coupled to one end of the sleeve, each liner flange including an inner surface adjacent to the sleeve and an outer surface facing away from the sleeve, the first liner positioned within the first pipe and the second liner positioned within the second pipe, the first and second liners facing each other such that the outer surface of the first liner contacts the outer surface of the second liner to form a seal between the first pipe and the second pipe; and
   first and second pipe flanges, each pipe flange of generally annular disc shape with an inner surface and an opposing outer surface including a plurality of circumferentially spaced plateaus positioned thereon, each plateau having a height above the outer surface, the first pipe flange configured to be coupled to one end of the first pipe and the second pipe flange configured to be coupled to one end of the second pipe, the first and second pipe flanges configured to couple to one another such that each plateau on the first pipe flange contacts a corresponding plateau on the second pipe flange.

10. The two pipe assembly of claim 9, wherein the inner surface of the liner flange of the first liner contacts at least a portion of the outer surface of the first pipe flange and the inner surface of the liner flange of the second liner contacts at least a portion of the outer surface of the second pipe flange.

11. The two pipe assembly of claim 9, wherein the liner flange of each of the first and second liners has a variable thickness and when the thickness is approximately equal to the height of each plateau, a nominal pressure is applied on the seal between the first pipe and the second pipe.

12. The two pipe assembly of claim 11, wherein when the liner flange of each of the first and second liners has a thickness that is less than the height of each plateau a greater than nominal pressure is applied on the seal between the first pipe and the second pipe.

13. The two pipe assembly of claim 11, wherein when the liner flange of each of the first and second liners has a thickness that is greater than the height of each plateau a less than nominal pressure is applied on the seal between the first pipe and the second pipe.

14. The two pipe assembly of claim 9, wherein each liner includes a plurality of cutouts, each cutout having a generally arcuate concave shape and being circumferentially spaced along an outer edge of the liner flange such that each cutout aligns with a successive one of the plateaus.

15. The two pipe assembly of claim 9, wherein each pipe flange includes a plurality of insets positioned at rotational angles on the inner surface thereof, each inset having a depth below the inner surface and aligned with a successive one of the plateaus.

16. The two pipe assembly of claim 9, wherein each pipe flange includes a plurality of openings from the inner surface to the outer surface, each opening positioned within a region occupied by a successive one of the plateaus and configured to receive a successive one of a plurality of fasteners.

* * * * *